United States Patent
Durand et al.

(10) Patent No.: US 10,375,109 B2
(45) Date of Patent: Aug. 6, 2019

(54) PROTECTING PERSONALLY IDENTIFIABLE INFORMATION FROM ELECTRONIC USER DEVICES

(71) Applicant: McAfee, LLC, Santa Clara, CA (US)

(72) Inventors: Ryan M. Durand, Hillsboro, OR (US);
Carl D. Woodward, Santa Clara, CA (US); Kunal Mehta, Hillsboro, OR (US); Lynda M. Grindstaff, Folsom, CA (US)

(73) Assignee: McAfee, LLC, Santa Clara, CA (US)

( * ) Notice: Subject to any disclaimer, the term of this patent is extended or adjusted under 35 U.S.C. 154(b) by 112 days.

(21) Appl. No.: 14/757,744

(22) Filed: Dec. 23, 2015

(65) Prior Publication Data
US 2017/0187748 A1    Jun. 29, 2017

(51) Int. Cl.
*H04L 29/06* (2006.01)

(52) U.S. Cl.
CPC .......... *H04L 63/1475* (2013.01); *H04L 63/04* (2013.01); *H04L 63/0407* (2013.01); *H04L 63/10* (2013.01); *H04L 63/126* (2013.01)

(58) Field of Classification Search
CPC . H04L 63/1475; H04L 63/04; G06F 21/6245; G06F 21/6254
See application file for complete search history.

(56) References Cited

U.S. PATENT DOCUMENTS

| | | | |
|---|---|---|---|
| 8,681,984 B2 | 3/2014 | Lee et al. | |
| 9,100,440 B1* | 8/2015 | Manmohan | H04L 63/20 |
| 2007/0250904 A1* | 10/2007 | Waller | G06F 21/6245 |
| | | | 726/1 |
| 2012/0084153 A1* | 4/2012 | Moreau | G06Q 30/02 |
| | | | 705/14.66 |
| 2012/0317024 A1* | 12/2012 | Rahman | G06Q 30/02 |
| | | | 705/42 |

(Continued)

FOREIGN PATENT DOCUMENTS

| | | |
|---|---|---|
| JP | 2003345724 A | 12/2003 |
| JP | 2004102913 A | 4/2004 |
| KR | 10-20080022731 A | 3/2008 |

OTHER PUBLICATIONS

PCT International Search Report and Written Opinion received in corresponding PCT Application No. PCT/US2016/060303, dated Feb. 21, 2017, 17 pages.

*Primary Examiner* — Ellen Tran
(74) *Attorney, Agent, or Firm* — Hanley, Flight and Zimmerman, LLC

(57) ABSTRACT

Protecting personally identifiable information data collected and/or stored in physical objects with embedded electronic devices by performing at least the following: obtaining a plurality of personally identifiable information algorithms for a plurality of electronic user devices, determining a relevant personally identifiable information algorithm from the plurality of personally identifiable information algorithms, executing the relevant personally identifiable information algorithm over the relevant personally identifiable information from one of the electronic user devices to construct a personally identifiable information data result, and transmitting the personally identifiable information data result without transmitting the relevant personally identifiable information to a remote computing system.

23 Claims, 5 Drawing Sheets

(56) References Cited

U.S. PATENT DOCUMENTS

| | | | |
|---|---|---|---|
| 2013/0333054 A1* | 12/2013 | Duke | G06F 21/6245 |
| | | | 726/28 |
| 2014/0059695 A1* | 2/2014 | Parecki | G06F 21/60 |
| | | | 726/26 |
| 2014/0160078 A1* | 6/2014 | Seo | G06F 3/017 |
| | | | 345/175 |
| 2014/0280751 A1 | 9/2014 | Lo | |
| 2015/0127298 A1* | 5/2015 | Gangumalla | G01C 22/006 |
| | | | 702/160 |

* cited by examiner

PROTECTING PERSONALLY IDENTIFIABLE INFORMATION FROM ELECTRONIC USER DEVICES

TECHNICAL FIELD

Embodiments described herein generally relate to transferring of data collected and/or stored on electronic user devices, and in particular for protecting personally identifiable information (PII) data collected and/or stored in physical objects with embedded electronic devices, such as wearable devices and/or other smart devices connected to the Internet of Things (IoT).

BACKGROUND ART

Modern data and computer networks comprise a variety of electronic user devices adapted to collect and exchange data information. Some of these data and computer networks can be generally referred to as IoTs. An IoT environment may comprise a plurality of physical objects that operate as electronic user devices, where each physical object includes embedded electronic components configured to collect and exchange data information. To collect and exchange data information over an IoT environment, the embedded electronic components may typically comprise computing hardware and software components, such as microcontrollers, control computing modules, network connectivity, firmware, and/or sensors. The embedded electronic components may also associate each of the physical objects with a unique identifier (e.g., an Internet Protocol (IP) address) such that the physical objects may collect and exchange the data information automatically and without direct human interaction. Examples of physical objects that can communicate within an IoT environment include, but are not limited to wearable devices, building and home automation devices, and/or control and sensory systems.

Wearable devices, in particular, are increasingly becoming more common place with the growth in popularity of smart wristbands that track end user activity and smartwatches. Wearable devices often collect and/or store PII data that may include sensitive and/or confidential information associated with a specific end user. Often times, remote computing systems, such as company data bases, may download and store the PII data from the wearable devices to perform market research, improve product development, and/or execute other forms of data analysis. Unfortunately, the remote computing systems that obtain the PII data are often susceptible to security breaches and threats. For example, computing security threats, such as computer malware, may compromise the remote computing systems in order to access and steal the PII data related to multiple end users. In addition, hackers may gain unauthorized entry to the computing systems for the purposes of stealing the PII data. As such, improving technology that properly manages and secures data remains valuable in preventing unwarranted access and theft of confidential and/or private information.

BRIEF DESCRIPTION OF DRAWINGS

For a more complete understanding of this disclosure, reference is now made to the following brief description, taken in connection with the accompanying drawings and detailed description, wherein like reference numerals represent like parts.

DESCRIPTION OF EMBODIMENTS

Figure 1:
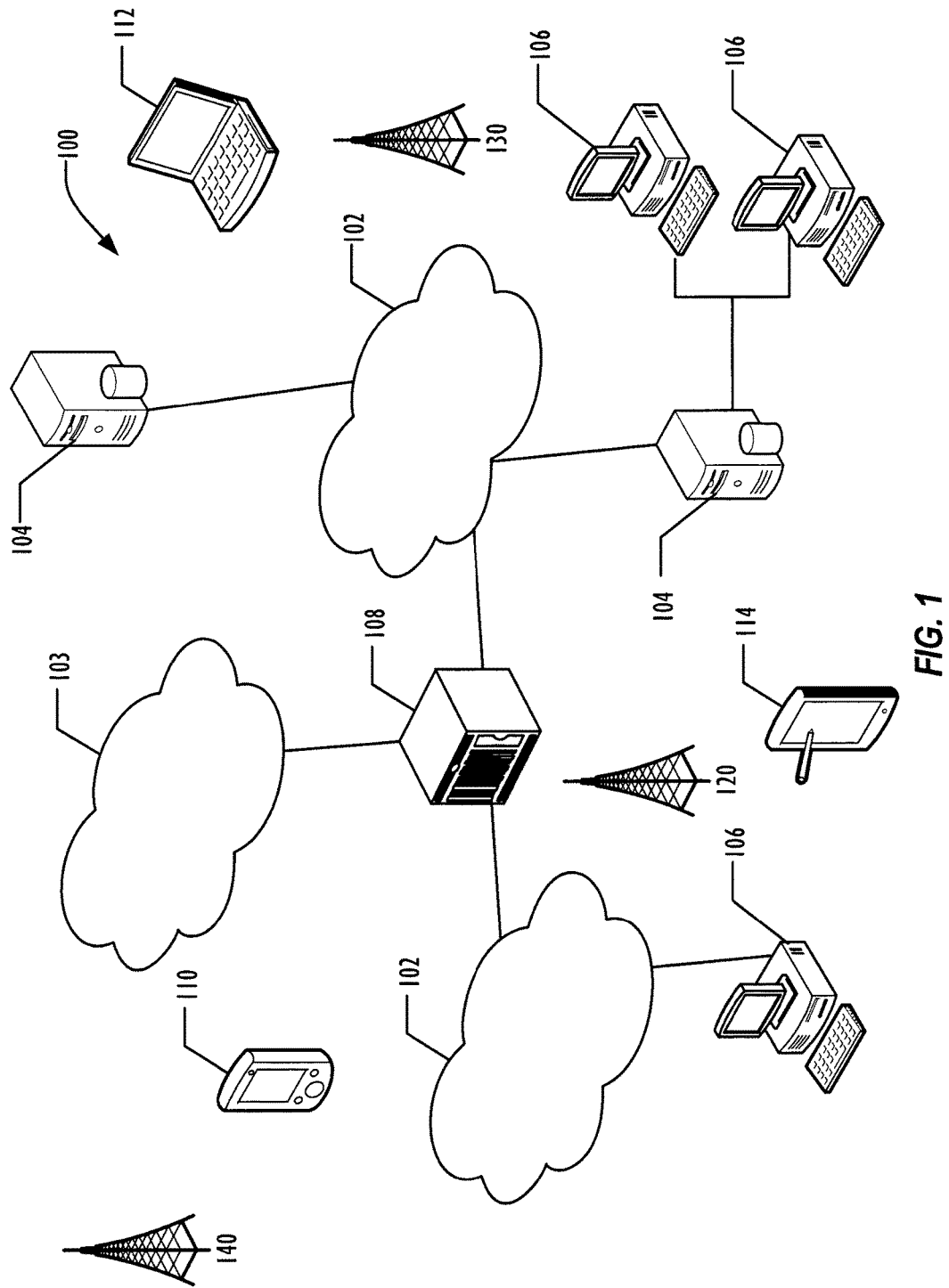
FIG. 1 is a schematic diagram of an embodiment of a network infrastructure where embodiments of the present disclosure may operate herein.

In the following description, for purposes of explanation, numerous specific details are set forth in order to provide a thorough understanding of the invention. It will be apparent, however, to one skilled in the art that the invention may be practiced without these specific details. In other instances, structure and devices are shown in block diagram form in order to avoid obscuring the invention. References to numbers without subscripts or suffixes are understood to reference all instance of subscripts and suffixes corresponding to the referenced number. Moreover, the language used in this disclosure has been principally selected for readability and instructional purposes, and may not have been selected to delineate or circumscribe the inventive subject matter, resort to the claims being necessary to determine such inventive subject matter. Reference in the specification to "one embodiment" or to "an embodiment" means that a particular feature, structure, or characteristic described in connection with the embodiments is included in at least one embodiment of the invention, and multiple references to "one embodiment" or "an embodiment" should not be understood as necessarily all referring to the same embodiment.

As used herein, the term "computing system" can refer to a single electronic computing device that includes, but is not limited to a single computer, host, virtual machine (VM), container, tenant, server, network device, wearable device, mobile device, smart device, and/or any physical object comprising an embedded electronic device or to a plurality of electronic computing devices working together to perform the function described as being performed on or by the computing system.

As used herein, the term "medium" refers to one or more non-transitory physical media that together store the contents described as being stored thereon. Embodiments may include non-volatile secondary storage, read-only memory (ROM), and/or random-access memory (RAM).

As used herein, the term "electronic user device" refers to any physical object that includes electronic components configured to collect and exchange data information.

As used herein, the term "wearable device" refers to any physical object worn by a user and configured to transmit and/or receive data over one or more communication environments (e.g., a computer network) and/or one or more connection links (e.g., a universal serial bus (USB) interface). Example embodiments of wearable devices include, but are not limited to smart wristbands that track user activity, smartwatches, smart eyewear, and wearable medical devices. Unless otherwise specified term "wearable device" may be interchanged and considered synonymous throughout this disclosure to the terms "wearable technology," "wearable electronic device," and/or "wearables."

Disclosed herein are various embodiments that control access of data collected and/or stored on one or more electronic user devices. In one embodiment, a computing system may be configured to prevent PII data collected and/or stored on one more electronic user devices from being accessed and transmitted to one or more remote computing systems. For example, the computing system may be configured to allow an end user to control the type of data, which electronic user devices, and/or any sensors a remote computing system can have access to. One or more PII algorithms may run on the electronic user devices and traverse the PII data to create PII data results that represent answers to specific questions generated from the PII algorithms. PII data results may be encoded using a variety of data structures, such as tuples, vectors, and/or lists. In one embodiment, the PII data results may not include any of the PII data, and the PII algorithms may not forward the PII data from the electronic user devices to the remote computing systems. The PII data results may be checked to confirm there is no PII data leakage and uploaded to the remote computing system.

FIG. 1 is a schematic diagram of an embodiment of a network infrastructure 100 where embodiments of the present disclosure may operate herein. Network infrastructure 100 comprises a plurality of computer networks 102. Each of the computer networks 102 may contain a number of other devices typically referred to as Internet of Things (microcontrollers, embedded systems, industrial control computing modules, etc.). Specifically, computer networks 102 comprise one or more different types of computer networks available today, such as the Internet, enterprise networks, data centers, a wide area networks (WAN), and/or a local area networks (LAN). Each of these networks within computer networks 102 may contain wired and/or wireless programmable devices that operator in the electrical and/or optical domain, and also employ any number of network communication protocols (e.g., TCP/IP). For example, one or more of the networks within computer networks 102 may be a wireless fidelity (Wi-Fi®) network, a Bluetooth® network, a Zigbee® network, and/or any other suitable radio based network as would be appreciated by one of ordinary skill in the art upon viewing this disclosure.

The networks within computer networks 102 may also comprise switches, routers, and/or other network hardware devices configured to transport data over computer networks 102. Moreover, one or more of the networks within computer networks 102 may be configured to implement computer virtualization, such as virtual private network (VPN) and/or cloud based networking. FIG. 1 illustrates that computer networks 102 may be connected to computers 106, computer servers 104, and one or more network nodes 108, which include, but are not limited to gateways, routers, and/or wireless access points. In one embodiment, one or more of the computers 106 and/or computer servers 104 may each comprise a plurality of VMs, containers, and/or other types of virtualized computing systems for processing computing instructions and transmitting and/or receiving data over computer networks 102. The computers 106 and computer server 104 may be configured to support a multi-tenant architecture, where each tenant may implement its own secure and isolated virtual network environment. Although not illustrated in FIG. 1, the network infrastructure 100 may connect computer networks 102 to a variety of other types of computing device, such as VMs, containers, hosts, storage devices, electronic user devices (e.g., wearable electronic devices), and/or any other electronic device capable of transmitting and/or receiving data over computer networks 102. The functionality of the network node 108 may be implemented in any device or combination of devices illustrated in FIG. 1; however, most commonly is implemented in a firewall or intrusion protection system in a gateway or router.

As shown in FIG. 1, network infrastructure 100 may also comprise a cellular network 103 for use with mobile communication devices. The cellular network 103 may be capable of supporting of a variety of electronic devices that include, but are not limited to computers, laptops, wearable electronic devices, mobile devices (e.g., mobile phones) and/or electronic user devices. Using FIG. 1 as an example, electronic devices in the network infrastructure 100 may communicate via the cellular network 103 are illustrated as mobile phones 110, laptops 112, and tablets 114. A mobile device, such as mobile phone 110, may interact with one or more mobile provider networks as the mobile device moves, typically interacting with a plurality of mobile network towers 120, 130, and 140 for connecting to the cellular network 103. Although referred to as a cellular network 103 in FIG. 1, a mobile device may interact with towers of more than one provider network, as well as with multiple non-cellular devices such as network node 108. In addition, the mobile devices 110, 112, and 114 may interact with non-mobile devices such as computers 104 and computer servers 106 for desired services.

In one or more embodiments, one or more mobile devices 110, 112, and 114, computer servers 104, computers 106, and/or electronic user devices (e.g., wearable devices) may support trusted operations through the employment of a trusted execution environment (TEE). The mobile devices 110, 112, and 114, computer servers 104, computers 106, and/or electronic user devices in network infrastructure 100 that support trusted operations may be referred to as trusted network devices throughout this disclosure. Trusted networks may be formed dynamically using trusted discovery which allows trusted network devices to discover other trusted network devices, or trusted network nodes, that include a trusted entity. For example, a TEE may implemented using the Intel® Manageability Engine. For purposes of the current disclosure, trusted networks may be formed by any means that allow services on trusted devices to remain opaque to network devices that are not part of the trusted network. Whereas untrusted discovery may reveal whether a particular node or network device may support trusted discovery, trusted discovery may be necessary to reveal additional trusted capabilities and services among trusted devices. Some examples of protocols that may be revealed only by trusted discovery include attestation, key agreement, group formation, trusted proxy, and provisioning.

In one or more embodiments, one or more mobile devices 110, 112, and 114, computer servers 104, computers 106, and/or electronic user devices (e.g., wearable devices) may support obscuring collected and/or stored PII data while allowing remote computing systems, such as third-party databases, to obtain relevant information that is based on the PII data. Rather than transmitting the actual PII data, the mobile devices 110, 112, and 114, computer servers 104, computers 106, and/or electronic user devices may send PII data results generated from one or more PII algorithms. The remote computing systems may interact with the PII data by running the PII algorithms on the mobile devices 110, 112, and 114, computer servers 104, computers 106, and/or electronic user devices such that the PII data results produced from the PII algorithms are sent back to a third-party's remote computing system (e.g., a central repository). Sending back the PII data results to the remote computing systems allows third-parties to gather the information relating to the end users without having to gather the actual PII data. Additionally, an end user of the mobile devices 110, 112, and 114, computer servers 104, computers 106, and/or electronic user devices may be able to grant and/or revoke access for one or more PII metrics or algorithms. If an end user revokes access to PII data previously collected, the mobile devices 110, 112, and 114, computer servers 104, computers 106, and/or electronic user devices can purge the PII data results from memory. In one embodiment, encryption may be used to transmit to the remote computing systems and/or store the PII algorithms and PII data results (e.g., PII pattern vectors) within the remote computing systems and/or the mobile devices 110, 112, and 114, computer servers 104, computers 106, and/or electronic user devices.

One illustrative example of accessing PII data may be to provide a meal plan services by a third-party, where the third-party accesses information related the PII data to provide further analysis and/or services to the end users. The third-party's remote computing systems may be unable to directly access the PII data because of the potential of revealing personal and confidential information and/or patterns about use for a particular end user. For meal plan services, one of the objectives may be to provide menu options for the upcoming days based on what an end user's current diet and activities. Relevant information that the third-party may want to obtain from electronic user devices could include the following:

- Food that the end user previously eaten. The food may have been manually entered by the end user.
- Burned calorie data from an activity tracker sensor.
- Location information from a phone/health sensor.
- The number of steps taken, times spent active and standing, and/or duration of physical activity from a sensor associated with the electronic user device and/or other computing systems,
- The amount of hours slept from a sensor associated with the electronic user device and/or other computing systems.
- The pulse and blood pressure data from health sensors.
- Blood glucose and/or lipids levels.
- Whether the meal items are already within the refrigerator.

The third-party meal service provider may want to process the relevant information to construct a meal plan for the end user. Rather than transferring the actual PII data to the third party's remote computing system for developing the meal plan for the end user, PII data results may be sent to the third party's remote computing system. In one embodiment, the actual PII data may be stored on one or more centralized computing system, such as a server. The centralized computing system may provide application program interfaces (APIs) for a third-party to query the PII data, but may restrict query answers to "yes or no" and/or other formats that prevent directly revealing personal and/or confidential information. Examples of question queries performed by the third-party include the following:

- Did the end user burn 500 calories or less than his or her target yesterday?
- Does the end user have chicken in the fridge?
- Did the end user walk between 1 and 2 miles yesterday?
- Did the end user's average heartrate during walking exceed 120 beats per minute (bpm)?
- Was the end user's walk more than 20 minutes long?

However, if the third-party's remote computing system queries and generates enough questions, sensitive and personal information may be derived from the questions.

In another embodiment, trusted and signed PII algorithms may run in a TEE environment that collect and/or store the PII data. The PII algorithms may be a signed computing package that can be proven to be both unmodified and from a known source via attestation. The PII algorithms may specify upfront the type of PII data that can be exported, which may also include a range of PII data, to produce PII data results. The produced PII data results may be learned security vectors and/or restricted export data that represent a signed response to the PII algorithm's query. Examples of the PII data results include ingredients, shopping list, receipt, and time/date information for any upcoming meals.

An end user may manually decide and/or set preferences within the electronic user device and/or a different computing system on whether the PII data results can be exported from the TEE. If the end user and/or the computing system decides the PII data results can be exported, a PII data result authenticator may check that the exported PII data results match the selections and/or configurations set by the end user. In one embodiment, the TEE may discard the algorithms and metadata after running on the electronic user device. By implementing the PII algorithm to run on the electronic user device, the PII algorithm verifies that it is running against the PII data for an end user via attestation. Additionally, the PII algorithms may not be retained because the TEE is known. The end user can also control the type of data exported, such as exporting only data results and not the end user's actual PII data, which typically includes sensitive data. The end users may also have the option to limit and filter personal information and habits provided to a third party remote computing system. For example, the type of data is limited to data relevant to construct a healthy diet plan, as opposed to all of an end user's health data.

Figure 2:
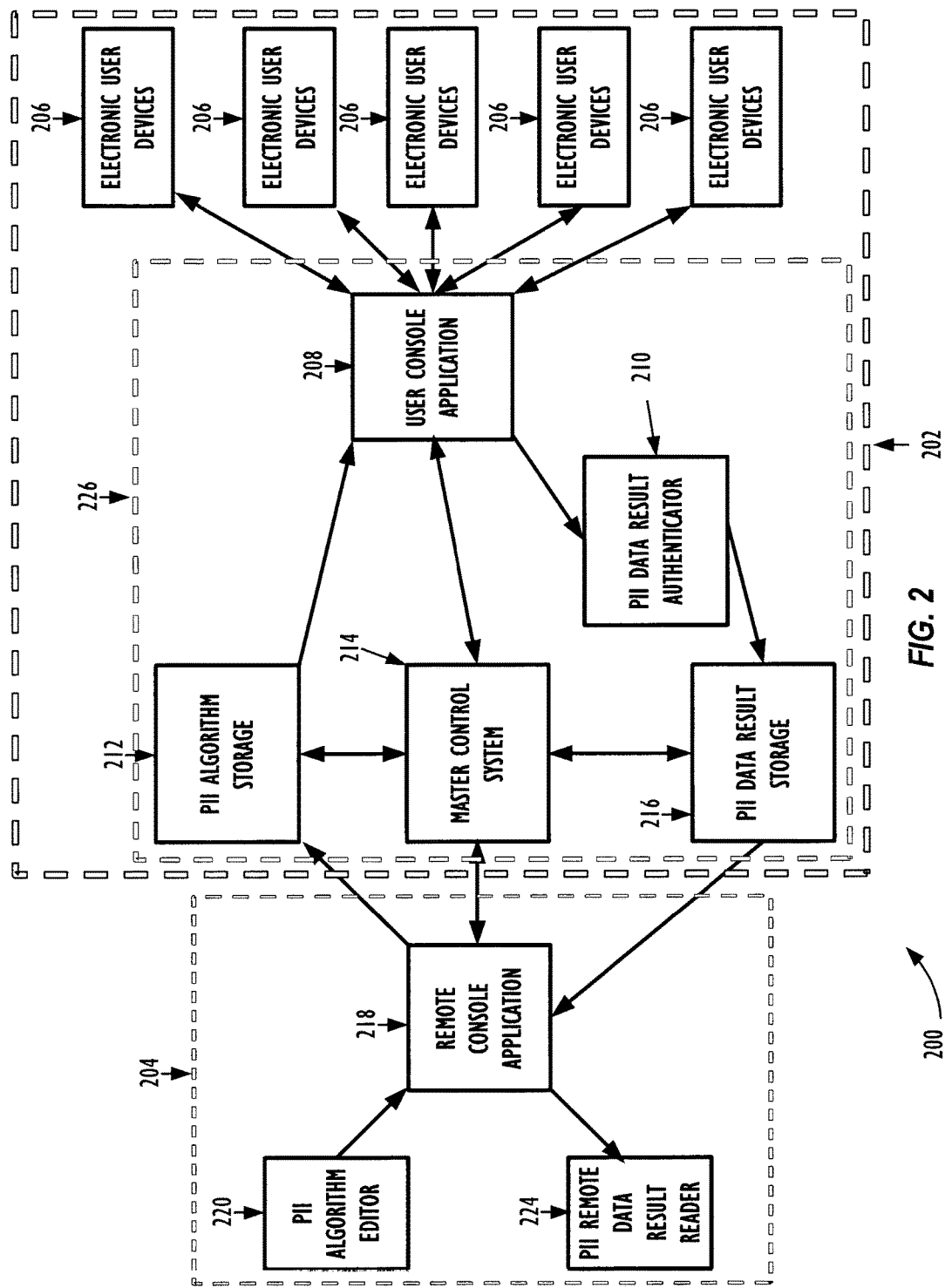
FIG. 2 is a schematic diagram of an embodiment of a computing system architecture configured to obscure PII data from third-party remote computing systems.

FIG. 2 is a schematic diagram of an embodiment of a computing system architecture 200 configured to obscure PII data from third-party remote computing systems. FIG. 2 illustrates that the computing system architecture 200 may comprise a user computing system 202 and a remote computing system 204. Using FIG. 1 as an example, computing system architecture 200 may be implemented in a TEE with trusted network devices. The user computing system 202 of the computing system architecture 200 may be implemented using one or more of the mobile devices 110, 112, and 114, computer servers 104, computers 106, and/or electronic user devices capable of connecting to computer network 102 and/or cellular network 103 that are shown in FIG. 1. The remote computing system 204 may be implemented on one or more VMs, hosts, servers, and/or other types of end nodes that transmit and receive data over a computer network and/or cellular network. In one embodiment, the remote computing system 204 may be part of and/or implemented using a third-party network, such as a data center and/or a third-party database.

The user computing system 202 may comprise one or more electronic user devices 206 and a PII control system 226. Specifically, FIG. 2 illustrates that the user computing system 202 comprises a plurality of electronic user devices 206. The electronic user devices 206 may be configured to collect and/or store one or more different types of PII data associated with one or more end users. Within this disclosure, each type of PII data may be generally referred to as a PII metric. For example, the electronic user device 206 may be configured to track a variety of PII metrics, such as monitoring an end user's number of steps, floors climbed, heart rate, sleep, and/or calories burned. The electronic user device 206 may also be configured to receive one or more PII algorithms obtained directly from the remote control system 204 and/or indirectly from the remote control system 204. FIG. 2 depicts an embodiment of electronic user device 206 receiving the PII algorithms indirectly from the remote control system 204 using the PII control system 226. Other embodiments of the computing system architecture 200 may have the PII algorithms preconfigured and/or pre-loaded onto the electronic user devices 206 and/or the PII control system 226. The PII algorithms may be a package that has been signed and can be proven to be both unmodified and from a known source via attestation.

The PII algorithms may run and execute on the electronic user device 206 to analyze actual PII data and extract relevant information into one or more specific data structure formats, such as tuples, vectors, and/or lists to construct the PIT data results. For example, the PII data results may be encoded in a vector data structure for encryption and authentication purposes. In one embodiment, the PII data results may not contain any of the actual PII data, and instead may contain answers to specific questions generated from the PII algorithms. Other embodiments of the PII data results may contain both the actual PII data and the answers generated from the PII algorithms. The amount of actual PII data the PII algorithms remove from the PII data results may depend on the extent of security protection an end user and/or third-party desires for the PII data. The PII algorithms may also specify upfront what PII data results may be exported, including the ranges of PII data. After running the PII algorithms, the PII data results may be transmitted to the PII control system 226, such as to the user console application 208.

The PII control system 226 may comprise a master control system 214 that includes one or more processors, which may also be referenced as a central processor unit (CPU). In one embodiment, the processor may comprise one or more multi-core processors and/or memory media (e.g., cache memory) that function as buffers and/or storage for data. Additionally, processor may be part of one or more other processing components, such as application specific integrated circuits (ASICs), field-programmable gate arrays (FPGAs), and/or digital signal processors (DSPs). The processors may enable the caster control system 214 to control and monitor the flow and execution of computing operations of the other components within the PII control system 226, such as the user console application 208, the PII data result authenticator 210, the PII algorithm storage 212, and/or the PII data result storage 216 that relate to the protection of PII data. In embodiments where the PII control system 226 is implemented within a single computing device, the master control system 214 may communicate with the other components via internal connections, such as a system bus. In other embodiments where the PII control system 226 is implemented amongst separate and independent computing devices, the master control system 214 may interface with one or more of the other components within the PII control system 226 using external connections, such as network connections. The master control system 214 may be configured to transmit and/or receive data, such as the PII data results and/or PII algorithms, to and/or from the remote control system 204.

The PII control system 226 may also include a user console application 208 that acts as a central hub to control access to one or more end users' PII data. For example, each end user within the user computing system 202 may be allocated its own user console application 208 for controlling access to the end user's PII data. Alternatively, a single user console application 208 may control access to multiple end users' PII data. The user console application 208 may be implemented in hardware, software, or combinations thereof. For example, the user console application 208 may comprise an electronic video interface, such as a graphical user interface (GUI), to display visual information to one or more end users.

To control access to one or more end users' PII data, the user console application 208 may list out various PII algorithms that third parties have attempted to run on the PII data. The user console application 208 may also contain a list of electronic user device 206 associated with an end user, as well as a list of the PII metrics the devices collect. In one embodiment, an end user can then select (e.g., via a GUI) which PII metrics the end user will allow remote computing system 204 to have access to and the PII algorithms that can run on the electronic user device 206 associated with the end user. Additionally or alternatively, the user console application 208 may act as an algorithm determination module that may automatically determine the applicable PII algorithms and PII metrics without input from an end user. The automatic determination of which PII algorithms and/or PII metrics the user console application 208 selects may be based on a variety of factors that include, but not limited to parameters set by the end user and/or previous end user selections. For example, parameters set by the end user and/or previous end user selections made may be factored using a weighted calculation and/or using any other suitable method to select the applicable PII algorithms and/or PII metrics. In embodiments where the remote computing system 204 indirectly provides the PII algorithm, once an end user confirms the use of the PII algorithm(s), the user console application 208 may then send the PII algorithm to the electronic user devices 206 for processing. If the end user revokes access to a PII algorithm or PII metric that the user console application 208 previously allowed, the user console application 208 can report this to the master control system 214 so that it may purge related data from the PII data result storage 216.

As shown in FIG. 2, the PII algorithm storage 212 and the PII data result storage 216 may interface and communicate with the user console application 208. The PII algorithm storage 212 and PII data result storage 216 may comprise one or more memory mediums configured to store data. For example both the PII algorithm storage 212 and PII data result storage 216 may comprise one or more memory devices that comprise secondary storage, ROM, and/or RAM. The secondary storage is typically comprised of one or more disk drives, optical drives, solid-state drives (SSDs), and/or tape drives and is used for non-volatile storage of data. In certain instances, the secondary storage may be used to store overflow data if the allocated RAM is not large enough to hold all working data. The secondary storage may also be used to store programs that are loaded into the RAM when such programs are selected for execution.

The PII algorithm storage 212 is configured to store PII algorithms received from remote computing system 204 and/or may be preloaded with certain PII algorithms. In FIG. 2, The PII algorithms may be uploaded to the PII algorithm storage 212 from the remote console application 218 and sent to the various user console applications 208. The PII algorithm storage 212 may also interface with the master control system 214 to receive computing instructions that indicate time instances that the PII algorithms are sent to specific user console applications 208. In another embodiment, the PII algorithm storage 212 may provide the master control system 214 the PII algorithms and the master control system 214 subsequently transmits the PII algorithms to the user consoler applications 208.

The PII data result storage 216 is configured to receive and store the PII data results. The PII data result storage 216 may communicate with the PII data result authenticator 210 to receive the PII data results after passing the authentication process implemented by the PII data result authenticator 210. The PII data result storage 216 may also interface with the master control system 214 and communicate with the remote computing system 204, such as the remote console application 218, based upon commands received from the master control system 214. For example, the PII data result storage 216 may comprises transmitters that transmit PII data results directly to the remote console application 218. Additionally or alternatively, the PII data result storage 216 may provide the master control system 214 the PII data results and the master control system 214 may subsequently forward the PII data results to the remote computing system 204. In certain instances, the PII data result storage 216 may purge specific memory entries upon commands from the master control system 214. For example, the master control system 214 may issue commands to the PII data result storage 216 to purge memory entries that store PII data results relating to revoked PII metrics and/or PII algorithms.

Prior to the PII data result storage 216 receiving the PII data results, a PII data result authenticator 210 may validate the PII data results obtained from the user console application 208 and/or electronic user devices 206. For example, PII data result authenticator 210 may authenticate a vector signature for the data results to ensure that the data results originated from the actual end user. The PII data result authenticator 210 may also run the PII data result through a data loss prevention suite to check that the appropriate amount of actual PII data (e.g., no actual PII data) is found within the data results. If the received PII data results fails any of the steps, the PII data result authenticator 210 can notify the master control system 214, such as sending a notification message, which PII algorithm failed and the origin of the failed data results.

FIG. 2 illustrates that the remote computing system 204 comprises a remote console application 218. The remote console application 218 may be implemented in hardware, software, or combination thereof such that a third-party is able to access the user computing system 202. In particular, the remote console application 218 may upload PII algorithms to the PII algorithm storage 212 and read PII data results from the PII data result storage 216. The remote console application 218 may allow a third-party to run its PII algorithms on an electronic user device and receive PII data results by communicating with the master control system 214. In one embodiment, the master control system 214 may implement a TEE to confirm the identity of the remote computing system 204 before allowing the remote console application 218 to upload the PII algorithms to the user computing system 202. In one embodiment, the TEE environment may be implemented using embedded hardware technologies, such as Intel's trusted execution technology (TXT) and Software Guard Extensions (SGX). Other TEE environments may be implemented using software or a combination of hardware and software. Each of the PII algorithms may also be signed by a third-party to ensure authenticity. The remote console application 218 may also provide the type of sensors and PII data a PII algorithm uses to the master control system 214 and/or the PII algorithm storage 212.

The remote computing system 204 may also comprise a PII algorithm editor 220, and a PII remote data result reader 224. The PII algorithm editor 220 represents a tool that a third-party can use to create a PII algorithm. The PII algorithm editor 220 may be implemented using an electronic video interface that displays the PII algorithm coding. The PII algorithm editor 220 may be configured to allow a third-party to add sensors and/or the type of data the PII algorithm uses to generate vector results. Additionally, the PII algorithm editor 220 may allow a third-party to specify which types of electronic user devices the third-party wants the PII algorithms to run on. The PII remote data result reader 224 may communicate with the remote console application 218 to read and process the contents of the PII data results for a third-party to use. The PII remote data result reader 224 may map the PII data results to the corresponding PII algorithms to produce the PII data results into a useable format for the third-party.

As persons of ordinary skill in the art are aware, although FIG. 2 illustrates a specific embodiment of a computing system architecture 200, the disclosure is not limited to the specific embodiment illustrated FIG. 2. For instance, embodiments of the present disclosure may combine one or more of the system components into a single system component. Using FIG. 2 as an example, the PII algorithm storage 212 and the PII data result storage 216 may be implemented within a single memory medium and the master control system 214 may also be configured to perform functions that are substantially similar to the PII data result authenticator 210. Additionally, the PII control system 226 may be implemented within one of the electronic user devices 206 and/or as a separate computing system. Moreover, the computing system architecture 200 may be implemented as separate device. For example, the PII algorithm storage 212 and the PII data result storage 216 may be implemented on separate servers that communicate with each other using one or more networks. The use and discussion of FIG. 2 is only an example to facilitate ease of description and explanation.

Figure 3:
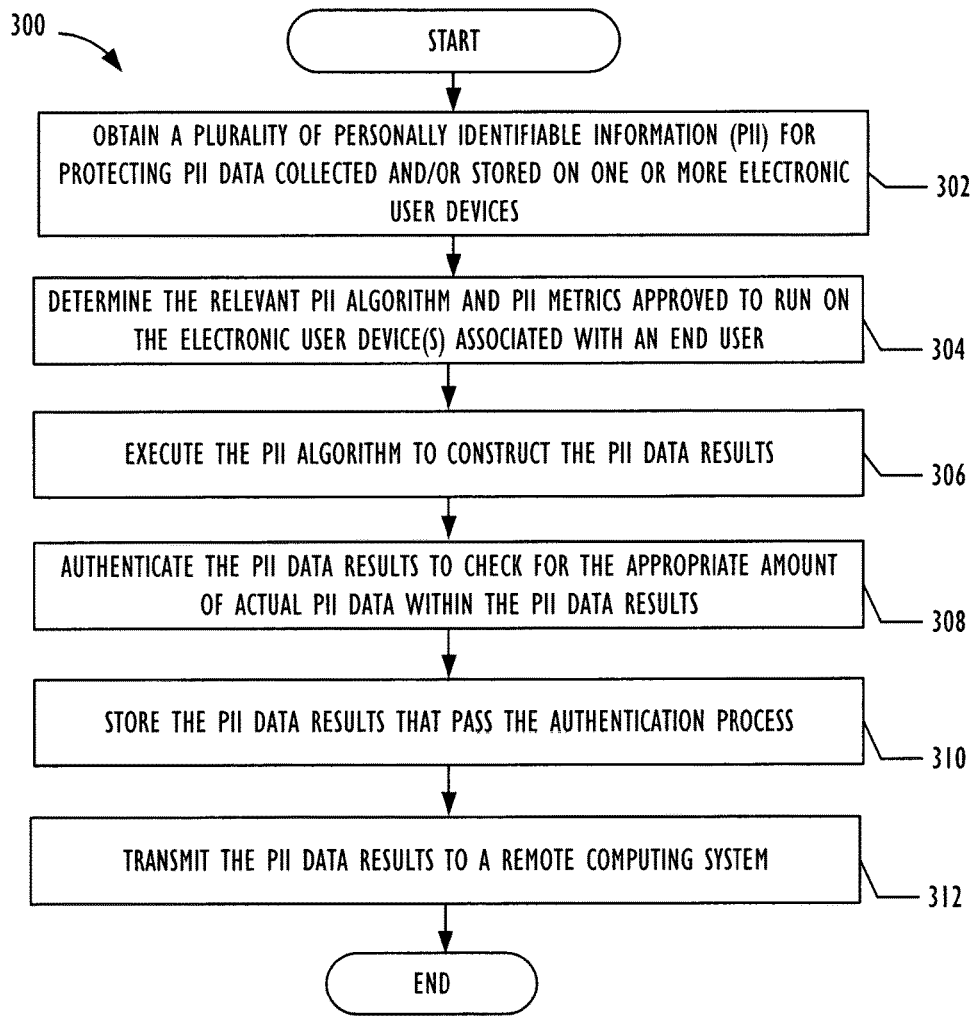
FIG. 3 is a flow chart of an embodiment of a method to protect PII data collected and/or stored in electronic user devices.

FIG. 3 is a flow chart of an embodiment of a method 300 to protect PII data collected and/or stored in electronic user devices. Using FIG. 1 as an example, method 300 may be implemented using the computing system architecture 200 and/or within be one or more mobile devices 110, 112, and 114, computer servers 104, computers 106, and/or electronic user devices capable of connecting to computer network 102 and/or cellular network 103. Method 300 may anonymize private, personal, and/or confidential data by limiting the transfer of actual PII data to remote computing systems. Method 300 provides an end user controlled access to his or her PII data, causes stolen PII related information from a remote computing system to be less valuable, and allows a third-party to use the collected PII data without revealing the actual PII data.

Method 300 may start at block 302 to obtain a plurality of PII algorithms for protecting PII data collected and/or stored on one more electronic user devices. In one embodiment, method 300 may obtain the PII algorithms from a remote computing system. Recall that in FIG. 2, the remote console application 218 may upload the PII algorithms within a TEE after confirming the identity of the remote computing system 204. In another embodiment, method 300 may obtain the PII algorithms by accessing one or more memory mediums that store preloaded and/or preconfigured PII algorithms.

Method 300 may then move to block 304 to determine the relevant PII algorithms and PII metrics approved to run on the electronic user device(s) associated with an end user. In one embodiment, method 300 may construct and display a list of PII algorithms and PII metrics associated with the electronic user devices. The end user may select and confirm the use of the PII algorithms and PII metrics. Other embodiments of method 300 may implement an automatic approach in selecting the PII algorithms and PII metrics. For example, method 300 may select the PII algorithms and PII metrics based on a plurality of user configuration parameters or preferences previously entered by the end user. Method 300 may then move to block 306 to execute the PII algorithm on the electronic user device(s) to construct the PII data results.

Method 300 may subsequently continue to block 308 and authenticate the PII results to check for the appropriate amount of actual PII data within the PII data results. In one embodiment, method 300 may check that no actual PII data is constructed within the PII data results. Other embodiments, may having vary degrees of actual PII within the PII data results depending on the level of security and protection of the PII data. Method 300 may proceed to block 310 and store the PII data results that pass the authentication process. The PII data results may be subsequently purged and deleted if an end user modifies his or her PII algorithm and metric selections. Afterwards, method 300 may proceed to block 312 and transmit the PII data results to a remote computing system. In one embodiment 300, method 300 may only transmit the PII data results after verifying the remote computing system is a trusted network device.

Figure 4:
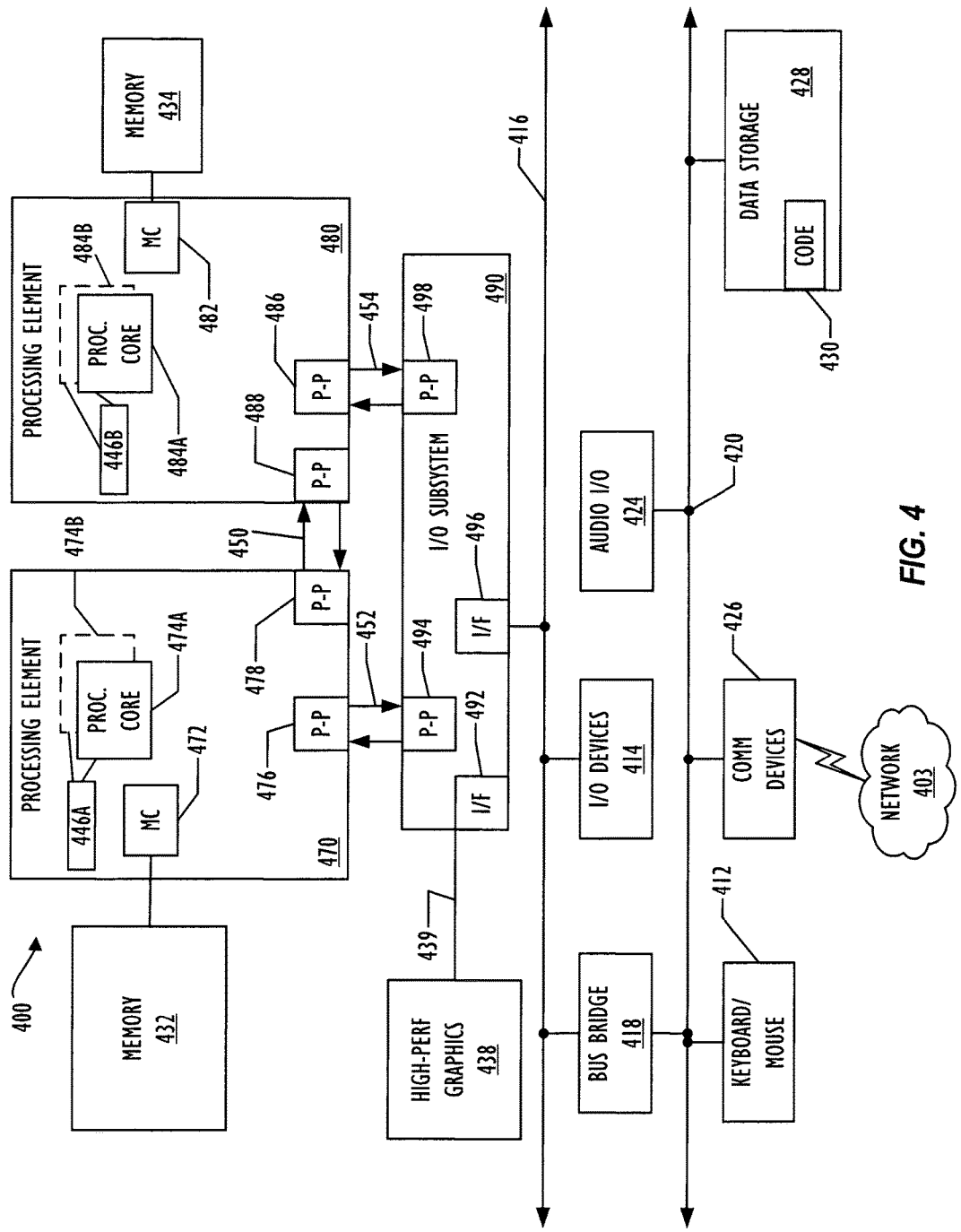
FIG. 4 is a block diagram illustrating an embodiment of a computing device for use with techniques described herein.

Referring now to FIG. 4, a block diagram illustrates a programmable device 400 that may be used for implementing the techniques described herein in accordance with one or more embodiments (e.g., computing system architecture 200 and method 300). The programmable device 400 illustrated in FIG. 4 is a multiprocessor programmable device that includes a first processing element 470 and a second processing element 480. While two processing elements 470 and 480 are shown, an embodiment of programmable device 400 may also include only one such processing element.

Programmable device 400 is illustrated as a point-to-point interconnect system, in which the first processing element 470 and second processing element 480 are coupled via a point-to-point interconnect 450. Any or all of the interconnects illustrated in FIG. 4 may be implemented as a multi-drop bus rather than point-to-point interconnects.

As illustrated in FIG. 4, each of processing elements 470 and 480 may be multicore processors, including first and second processor cores (i.e., processor cores 474a and 474b and processor cores 484a and 484b). Such cores 474a, 474b, 484a, 484b may be configured to execute computing instruction code. However, other embodiments may use processing elements that are single core processors as desired. In embodiments with multiple processing elements 470, 480, each processing element may be implemented with different numbers of cores as desired.

Each processing element 470, 480 may include at least one shared cache 446. The shared cache 446a, 446b may store data (e.g., computing instructions) that are utilized by one or more components of the processing element, such as the cores 474a, 474b and 484a, 484b, respectively. For example, the shared cache may locally cache data stored in a memory 432, 434 for faster access by components of the processing elements 470, 480. In one or more embodiments, the shared cache 446a, 446b may include one or more mid-level caches, such as level 2 (L2), level 3 (L3), level 4 (L4), or other levels of cache, a last level cache (LLC), or combinations thereof.

While FIG. 4 illustrates a programmable device with two processing elements 470, 480 for clarity of the drawing, the scope of the present invention is not so limited and any number of processing elements may be present. Alternatively, one or more of processing elements 470, 480 may be an element other than a processor, such as an graphics processing unit (GPU), a digital signal processing (DSP) unit, a field programmable gate array, or any other programmable processing element. Processing element 480 may be heterogeneous or asymmetric to processing element 470. There may be a variety of differences between processing elements 470, 480 in terms of a spectrum of metrics of merit including architectural, microarchitectural, thermal, power consumption characteristics, and the like. These differences may effectively manifest themselves as asymmetry and heterogeneity amongst processing elements 470, 480. In some embodiments, the various processing elements 470, 480 may reside in the same die package.

First processing element 470 may further include memory controller logic (MC) 472 and point-to-point (P-P) interconnects 476 and 478. Similarly, second processing element 480 may include a MC 482 and P-P interconnects 486 and 488. As illustrated in FIG. 4, MCs 472 and 482 couple processing elements 470, 480 to respective memories, namely a memory 432 and a memory 434, which may be portions of main memory locally attached to the respective processors. While MC logic 472 and 482 is illustrated as integrated into processing elements 470, 480, in some embodiments the memory controller logic may be discrete logic outside processing elements 470, 480 rather than integrated therein.

Processing element 470 and processing element 480 may be coupled to an I/O subsystem 490 via respective P-P interconnects 476 and 486 through links 452 and 454. As illustrated in FIG. 4, I/O subsystem 490 includes P-P interconnects 494 and 498. Furthermore, I/O subsystem 490 includes an interface 492 to couple I/O subsystem 490 with a high performance graphics engine 438. In one embodiment, a bus (not shown) may be used to couple graphics engine 438 to I/O subsystem 490. Alternately, a point-to-point interconnect 439 may couple these components.

In turn, I/O subsystem 490 may be coupled to a first link 416 via an interface 496. In one embodiment, first link 416 may be a Peripheral Component Interconnect (PCI) bus, or a bus such as a PCI Express bus or another I/O interconnect bus, although the scope of the present invention is not so limited.

As illustrated in FIG. 4, various I/O devices 414, 424 may be coupled to first link 416, along with a bridge 418 that may couple first link 416 to a second link 420. In one embodiment, second link 420 may be a low pin count (LPC) bus. Various devices may be coupled to second link 420 including, for example, a keyboard/mouse 412, communication device(s) 426 (which may in turn be in communication with the computer network 403), and a data storage unit 428 such as a disk drive or other mass storage device which may include code 430, in one embodiment. The code 430 may include instructions for performing embodiments of one or more of the techniques described above. Further, an audio I/O 424 may be coupled to second link 420.

Note that other embodiments are contemplated. For example, instead of the point-to-point architecture of FIG. 4, a system may implement a multi-drop bus or another such communication topology. Although links 416 and 420 are illustrated as busses in FIG. 4, any desired type of link may be used. In addition, the elements of FIG. 4 may alternatively be partitioned using more or fewer integrated chips than illustrated in FIG. 4.

Figure 5:
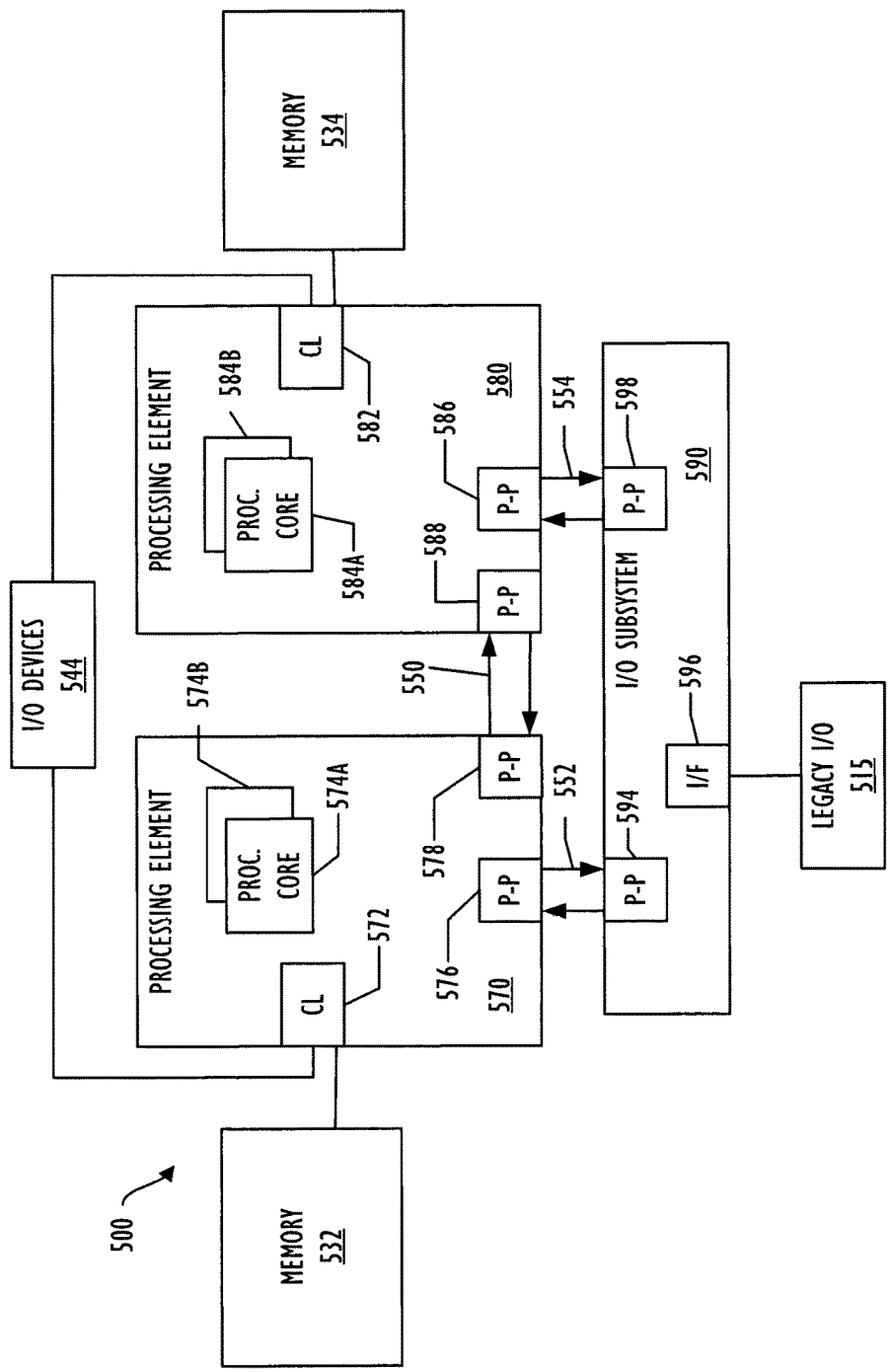
FIG. 5 is a block diagram illustrating another embodiment of computing device for use with techniques described herein.

Referring now to FIG. 5, a block diagram illustrates a programmable device 500 according to another embodiment. Certain aspects of FIG. 5 have been omitted from FIG. 5 in order to avoid obscuring other aspects of FIG. 5.

FIG. 5 illustrates that processing elements 570, 580 may include integrated memory and I/O control logic ("CL") 572 and 582, respectively. In some embodiments, the 572, 582 may include memory control logic (MC) such as that described above in connection with FIG. 4. In addition, CL 572, 582 may also include I/O control logic. FIG. 5 illustrates that not only may the memories 532, 534 be coupled to the CL 572, 582, but also that I/O devices 544 may also be coupled to the control logic 572, 582. Legacy I/O devices 515 may be coupled to the I/O subsystem 590 by interface 596. Each processing element 570, 580 may include multiple processor cores, illustrated in FIG. 5 as processor cores 574A, 574B, 584A and 584B. As illustrated in FIG. 5, I/O subsystem 590 includes point-to-point (P-P) interconnects 594 and 598 that connect to P-P interconnects 576 and 586 of the processing elements 570 and 580 with links 552 and 554. Processing elements 570 and 580 may also be interconnected by link 550 and interconnects 578 and 588, respectively.

The programmable devices depicted in FIGS. 4 and 5 are schematic illustrations of embodiments of programmable devices that may be utilized to implement various embodiments discussed herein. Various components of the programmable devices depicted in FIGS. 4 and 5 may be combined in a system-on-a-chip (SoC) architecture.

Program instructions may be used to cause a general-purpose or special-purpose processing system that is programmed with the instructions to perform the operations described herein. Alternatively, the operations may be performed by specific hardware components that contain hardwired logic for performing the operations, or by any combination of programmed computer components and custom hardware components. The methods described herein may be provided as a computer program product that may include a machine readable medium having stored thereon instructions that may be used to program a processing system or other electronic device to perform the methods. The term "machine readable medium" used herein shall include any medium that is capable of storing or encoding a sequence of instructions for execution by the machine and that cause the machine to perform any one of the methods described herein. The term "machine readable medium" shall accordingly include, but not be limited to, tangible, non-transitory memories such as solid-state memories, optical and magnetic disks. Furthermore, it is common in the art to speak of software, in one form or another (e.g., program, procedure, process, application, module, logic, and so on) as taking an action or causing a result. Such expressions are merely a shorthand way of stating that the execution of the software by a processing system causes the processor to perform an action or produce a result.

At least one embodiment is disclosed and variations, combinations, and/or modifications of the embodiment(s) and/or features of the embodiment(s) made by a person having ordinary skill in the art are within the scope of the disclosure. Alternative embodiments that result from combining, integrating, and/or omitting features of the embodiment(s) are also within the scope of the disclosure. Where numerical ranges or limitations are expressly stated, such express ranges or limitations may be understood to include iterative ranges or limitations of like magnitude falling within the expressly stated ranges or limitations (e.g., from about 1 to about 10 includes, 2, 3, 4, etc.; greater than 0.10 includes 0.11, 0.12, 0.13, etc.). The use of the term "about" means±10% of the subsequent number, unless otherwise stated.

Use of the term "optionally" with respect to any element of a claim means that the element is required, or alternatively, the element is not required, both alternatives being within the scope of the claim. Use of broader terms such as comprises, includes, and having may be understood to provide support for narrower terms such as consisting of, consisting essentially of, and comprised substantially of. Accordingly, the scope of protection is not limited by the description set out above but is defined by the claims that follow, that scope including all equivalents of the subject matter of the claims. Each and every claim is incorporated as further disclosure into the specification and the claims are embodiment(s) of the present disclosure.

The following examples pertain to further embodiments.

Example 1 is a machine readable medium on which instructions are stored, comprising instructions that when executed cause a machine for obscuring data to: obtain a plurality of personally identifiable information algorithms for a plurality of electronic user devices, determine a relevant personally identifiable information algorithm from the plurality of personally identifiable information algorithms to extract relevant personally identifiable information from one of the electronic user devices, receive a personally identifiable information data result that is based on running the personally identifiable information algorithm on the electronic user device, and transmit the personally identifiable information data result without transmitting the relevant personally identifiable information to a remote computing system.

In Example 2, the subject matter of Example 1 can optionally include instructions, when executed, causes the machine to authenticate that the personally identifiable information data results originate from an actual end user.

In Example 3, the subject matter of Example 1 or Example 2 can optionally include instructions, when executed, causes the machine to perform data loss prevention to check for no leakage of the relevant personally identifiable information.

In Example 4, the subject matter of Example 1, Example 2, or Example 3 can optionally include instructions, when executed, causes the machine to determine a relevant personally identifiable information algorithm from the plurality of personally identifiable information algorithms by performing at least the following: generating a list of personally identifiable information algorithms associated with the one of the one of the electronic user devices and displaying the list of personally identifiable information algorithms on a graphical user interface.

In Example 5, the subject matter of Example 1, Example 2, or Example 3 can optionally include instructions, when executed, causes the machine to determine a relevant personally identifiable information algorithm from the plurality of personally identifiable information algorithm by performing at least the following: obtain end user parameters and automatically select the relevant personally identifiable information based on the end user parameters.

In Example 6, the subject matter of any of the Examples 1-5 can optionally include instructions, when executed, cause the machine to select one or more personally identifiable information metrics that identify a type of relevant personally identifiable information.

In Example 7, the subject matter of any of the Examples 1-6 can optionally include that the personally identifiable information algorithm is obtained from the remote computing system.

In Example 8, the subject matter of Example 7 can optionally include that the address translation data structure is adapted to perform a second level address translation that provides hardware-assisted virtualization of the machine.

In Example 9, the subject matter of any of the Examples 1-8 can optionally that authenticating the personally identifiable information algorithm is implemented in a trusted execution environment.

In Example 10, the subject matter of Example 1 can optionally include instructions, when executed causes the machine to revoke access of the relevant personally identifiable information algorithm and purge the personally identifiable information data results.

In Example 11, the subject matter of any of the Examples 1-10 can optionally include that the relevant personally identifiable information algorithm identifies a plurality of relevant sensors and types of personally identifiable information data.

Example 12 includes a system for obscuring data, comprising at least one processor; and a memory, coupled to the processor, and comprises instructions, when executed by the processor causes the system to: obtain a plurality of personally identifiable information algorithms for a plurality of electronic user devices, determine a relevant personally identifiable information algorithm from the plurality of personally identifiable information algorithms, execute the relevant personally identifiable information algorithm over relevant personally identifiable information from one of the electronic user devices to construct a personally identifiable information data result, and transmit the personally identifiable information data result without transmitting the relevant personally identifiable information to a remote computing system.

In Example 13, the subject matter of Example 12 can optionally include instructions that cause the system to authenticate that the personally identifiable information data results originate from an actual end user.

In Example 14, the subject matter of Example 12 or 13 can optionally include instructions that cause the system to perform data loss prevention to check for no leakage of the relevant personally identifiable information.

In Example 15, the subject matter of Example 12, Example 13, or Example 14 can optionally include instructions that cause the system to select one or more personally identifiable information metrics that identify a type of relevant personally identifiable information.

In Example 16, the subject matter of any of the Examples 12-15 can optionally include that the personally identifiable information algorithm is obtained from the remote computing system after authenticating the personally identifiable information algorithm.

In Example 17, the subject matter of Example 12 can optionally include instructions that causes the system to revoke access of the relevant personally identifiable information algorithm and purge the personally identifiable information data results.

Example 18 includes a method for obscuring data, comprising obtaining, using a programmable device, a plurality of personally identifiable information algorithms for a plurality of electronic user devices, determining, using the programmable device, a relevant personally identifiable information algorithm from the plurality of personally identifiable information algorithms to extract relevant personally identifiable information from one of the electronic user devices, receiving, using the programmable device, a personally identifiable information data result that is based on running the personally identifiable information algorithm on the electronic user device, and transmitting, using the programmable device, the personally identifiable information data result without transmitting the relevant personally identifiable information to a remote computing system.

In Example 19, the subject matter of Example 18 can optionally include authenticating, using the programmable device that the personally identifiable information data results originate from an actual end user.

In Example 20, the subject matter of Example 18 or Example 19 can optionally include performing, using the programmable device, data loss prevention to check for no leakage of the relevant personally identifiable information.

In Example 21, the subject matter of Example 18, Example 19, or Example 20 can optionally include selecting, using the programmable device, one or more personally identifiable information metrics that identify a type of relevant personally identifiable information.

In Example 22, the subject matter of any of the Examples 18-21 can optionally include that the relevant personally identifiable information algorithm identifies a plurality of relevant sensors and types of personally identifiable information data.

Example 23 includes a system for obscuring data, comprising: a personally identifiable information algorithm storage configured to store a plurality of personally identifiable information algorithms, a user console application configured to determine a relevant personally identifiable information algorithm from the plurality of personally identifiable information algorithms, a electronic user device configured to execute the relevant personally identifiable information algorithm over relevant personally identifiable information algorithms to construct a personally identifiable information data result, a personally identifiable information a data result storage configured to store the personally identifiable information data result, and a master control system configured to forward the personally identifiable information data result without including the relevant personally identifiable information to a remote computing system.

In Example 24, the subject matter of Example 23 can optionally include a personally identifiable information data result authenticator configured to authenticate that the personally identifiable information data results originate from an actual end user.

In Example 25, the subject matter of Example 23 or Example 24 can optionally include that the user console application is further configured to revoke access of the relevant personally identifiable information algorithm.

Example 26 includes a system for obscuring data, comprising: means to obtain a plurality of personally identifiable information algorithms, means to determine a relevant personally identifiable information algorithm from the plurality of personally identifiable information, means to execute the relevant personally identifiable information algorithm over relevant personally identifiable information algorithms to construct a personally identifiable information data result, means to store the personally identifiable information data result, and means to transmit the personally identifiable information data result without transmitting the relevant personally identifiable information to a remote computing system.

In Example 27, the subject matter of Example 26 can optionally include means to authenticate that the personally identifiable information data results originate from an actual end user.

In Example 28, the subject matter of Example 26 can optionally include means to select the personally identifiable information metrics that identify a type of relevant personally identifiable information.

It is to be understood that the above description is intended to be illustrative, and not restrictive. For example, the above-described embodiments may be used in combination with each other. Many other embodiments will be apparent to those of skill in the art upon reviewing the above description. The scope of the invention therefore should be determined with reference to the appended claims, along with the full scope of equivalents to which such claims are entitled. It should be noted that the discussion of any reference is not an admission that it is prior art to the present invention, especially any reference that may have a publication date after the priority date of this application,

What is claimed is:

1. A machine readable storage device, comprising instructions that, when executed, cause a machine to at least:
   select a first algorithm of a plurality of algorithms for transmission to an electronic device, the plurality of algorithms to operate on user activity information, the plurality of algorithms obtained from a third party computing system;
   transmit the first algorithm to the electronic device to cause the electronic device to run the first algorithm to generate a response to a query, the query about user activity information collected at the electronic device, the user activity information stored as digital data, the response based on the user activity information;
   verify that the response to the query excludes the user activity information;
   transmit the response to the query to the third party computing system; and
   secure the digital data by concealing the user activity information from the third party computing system.

2. The machine readable storage device of claim 1, wherein the instructions, when executed, cause the machine to verify the response to the query is associated with a user of the electronic device based on a signature.

3. The machine readable storage device of claim 1, wherein the instructions, cause the machine to perform a data loss prevention analysis of the response to the query prior to transmitting the response to the query to the third party computing system.

4. The machine readable storage device of claim 1, wherein the instructions, when executed, cause the machine to select the first algorithm from the plurality of algorithms by at least:
   generating a list of a subset of the plurality of algorithms associated with the electronic device;
   displaying the list of the subset of the plurality of algorithms on a graphical user interface; and
   responding to a selection of the first algorithm from a user input device.

5. The machine readable storage device of claim 1, wherein the instructions, when executed, cause the machine to select the first algorithm from the plurality of algorithms based on one or more parameters specified by a user of the electronic device.

6. The machine readable storage device of claim 1, wherein the instructions, when executed, cause the machine to verify that the third party computing system corresponds to a trusted computing system prior to obtaining the algorithms from the third party computing system.

7. The machine readable storage device of claim 1, wherein the instructions, when executed, cause the machine to:
   store the response to the query in a memory; and
   in response to a request to revoke access of the first algorithm to the user activity information, purge the response to the query from the memory.

8. The machine readable storage device of claim 1, wherein the first algorithm includes metadata to identify one or more sensors and to identify the user activity information as a type of the user activity information used to generate the response to the query.

9. The machine readable storage device of claim 1, wherein the response to the query includes yes and no answers generated by the first algorithm based on the user activity information.

10. The machine readable storage device of claim 1, wherein the first algorithm is obtained from the third party computing system with metadata identifying a type of the user activity information.

11. A system for obscuring data, the system comprising:
    at least one processor; and
    a memory, in communication with the processor, the memory including instructions, which when executed cause the at least one processor to at least:
    select a first algorithm from a plurality of algorithms, the first algorithm to be transmitted to an electronic device;
    transmit the first algorithm to the electronic device to cause the electronic device to run the first algorithm to generate a response to the query, the query about user behavior data stored at the electronic device, the user behavior data stored as digital data, the response based on the user behavior data;
    verify that the response to the query excludes the user behavior data;
    transmit the response to the query to a third party computing system; and
    secure the digital data by concealing the user behavior data from the third party computing system.

12. The system of claim 11, wherein the instructions further cause the at least one processor to authenticate the response to the query as being associated with a user of the electronic device based on a signature.

13. The system of claim 11, wherein the instructions further cause the at least one processor to perform a data loss prevention analysis of the response to the query prior to transmitting the response to the query to the third party computing system.

14. The system of claim 11, wherein the instructions further cause the at least one processor to cause the first algorithm to be transmitted to the electronic device in response to an input authorizing the response to the query to be generated based on a type of user behavior data corresponding to the user behavior data stored at the electronic device.

15. The system of claim 11, wherein the instructions further cause the at least one processor to:
    obtain the plurality of algorithms from the third party computing system; and
    verify that the third party computing system corresponds to a trusted computing system prior to obtaining the plurality of algorithm from the third party computing system.

16. The system of claim 11, wherein the instructions cause the at least one processor to:
- store the response to the query; and
- in response to a request to revoke access of the first algorithm to the user behavior data stored at the electronic device, purge the response to the query.

17. A method for obscuring data, the method comprising:
- accessing, by executing an instruction with a programmable device, a plurality of algorithms to operate on user behavior tracking data, the plurality of algorithms supplied by a third party;
- selecting, by executing an instruction with the programmable device, a first algorithm of the plurality of algorithms to be transmitted to an electronic device;
- transmitting the first algorithm to the electronic device to cause the electronic device to run the first algorithm to generate a response to a query, the query about user behavior tracking data stored at the electronic device, the user behavior tracking data stored as digital data, the response based on the user behavior tracking data;
- verifying, by executing an instruction with the programmable device, that the response to the query excludes the user behavior tracking data;
- transmitting, from the programmable device, the response to the query to a third party computing system; and
- securing, by executing an instruction with the programmable device, the digital data by concealing the user behavior tracking data from the third party computing system.

18. The method of claim 17, further including authenticating, with the programmable device, that the response to the query is associated with a known user of the electronic device, based on a signature.

19. The method of claim 17, further including performing, by executing an instruction with the programmable device, a data loss prevention analysis of the response to the query prior to transmitting the response to the query to the third party computing system.

20. The method of claim 17, wherein the first algorithm includes metadata identifying: (a) one or more sensors, and (b) the user behavior tracking data used to generate the response to the query.

21. A system for obscuring user activity data, the system comprising:
- a first storage to store a plurality of algorithms supplied by a third party computing system;
- a user console application to receive input to identify a first algorithm of the plurality of algorithms;
- a second storage to store a response to a query, the query about user activity data collected at an electronic device, the user activity data stored as digital data, the response generated by the electronic device based on the first algorithm;
- an authenticator to verify that the response to the query excludes the user activity data; and
- a master control system to:
  - forward the response to the query to the third party computing system, and
  - secure the digital data by concealing the user activity data from the third party computing system.

22. The system of claim 21, further including a query response authenticator to authenticate that the response to the query is associated with a known user based on a signature included with the query response.

23. The system of claim 21, wherein the user console application is further to revoke access of the first algorithm to the electronic device.

\* \* \* \* \*